United States Patent
Aldridge et al.

(10) Patent No.: US 6,795,781 B2
(45) Date of Patent: Sep. 21, 2004

(54) METHOD AND APPARATUS FOR COMPILER ASSISTED POWER MANAGEMENT

(75) Inventors: Tomm Aldridge, Olympia, WA (US); Devadatta V. Bodas, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 10/185,494

(22) Filed: Jun. 27, 2002

(65) Prior Publication Data

US 2004/0002823 A1 Jan. 1, 2004

(51) Int. Cl.$^7$ .............................................. G01R 21/00
(52) U.S. Cl. ....................................... 702/60; 713/310
(58) Field of Search ............................ 702/60; 713/310, 713/320, 321, 322, 323, 324, 330, 340

(56) References Cited

U.S. PATENT DOCUMENTS 6,219,796 B1 * 4/2001 Bartley ....................... 713/320
6,430,693 B2 * 8/2002 Lin ............................ 713/322

* cited by examiner

*Primary Examiner*—John Barlow
*Assistant Examiner*—Stephen J. Cherry
(74) *Attorney, Agent, or Firm*—Blakely, Sokoloff, Taylor & Zafman LLP

(57) ABSTRACT

A method and apparatus for a compiler, or similar computer language translating device, to translate a computer language into a sequence of electronic instructions to be executed at run-time by at least one functional unit in a computer. At compile time, the compiler creates and analyzes the sequential order of the electronic instructions to determine exact moments when the functional unit will begin to, or complete, executing the electronic instructions. Consequently, the compiler can predict time intervals when the functional unit will be in use, or idling between instructions. In addition, the compiler knows the delay time, or latency, involved in powering up and powering down the functional unit. The compiler compares the use times, or idle times, to the latency, and creates power-controlling instructions to be embedded into the sequence of electronic instructions. The power-controlling instructions are to control power to the functional units at run-time.

29 Claims, 14 Drawing Sheets

METHOD AND APPARATUS FOR COMPILER ASSISTED POWER MANAGEMENT

FIELD

The present invention relates generally to the field of power management in a computer and, more specifically, to power management in an electronic device.

BACKGROUND

Power consumption by computer processors increases every generation. It is becoming more important to mange the amount and rate of power consumption. A successful power management scheme could improve power performance efficiency and help reduce average die temperature. A computer processor, also known as a central processing unit ("CPU"), is comprised of several functional units such as registers, arithmetic logic units, flopping point units, etc. These functional units consume power when in use.

Some conventional methods have been employed to try to manage, and consequently conserve, power in a CPU. For example, some conventional methods recognize that a large amount of power consumed by the CPU is proportional to the frequency of the clock sequencing the operation of the CPU. Because CPUs spend a large percentage of time idling (in idle loops, waiting for input-output operations to complete, etc.), some power management systems have concentrated on reducing CPU clock speed during periods of CPU inactivity and during periods when the operations performed by the CPU do not require high clock frequencies. However, these methods only slow down the power-loss by slowing down the clock frequencies, still allowing large amounts of power to be wasted. Also, these methods are characterized by educated guess work. For example, these methods must recognize when the functional units are actually idling. To do this, the methods must monitor functional units to ensure that the functional units are not actually executing instructions before slowing down the clock frequencies, so as not to adversely affect the functional units performance. However, monitoring the functional units may require waiting for several clock cycles to ensure that the functional unit is truly idle. Power is lost during the wait time. Additionally, when the functional unit must perform again, several clock cycles of delay may be required to get the clock frequencies back up to speed, thus slowing down performance speed of the processor.

Other methods attempt to power-down functional units when they are idle. These methods, however, are also characterized by guesswork just as are the methods for slowing the clock frequencies. These methods must monitor the functional units for idling. As the method monitors for idle cycles, however, it must wait a certain number of clock cycles to unsure that functional units are truly idle, then power them down. The wait time leads to lost power. Additionally, once powered-down, the functional units may experience a delay time in powering back up. The power-up delay time means that the instructions may not be performed as quickly as they could have if the functional unit had never been powered-down. Thus, this delay time can also adversely affect CPU performance speed immensely.

BRIEF DESCRIPTION OF THE DRAWINGS

Embodiments of the present invention are illustrated by way of example and should not be limited by the figures of the accompanying drawings in which like references indicate similar elements and in which.

DETAILED DESCRIPTION

Figure 1:
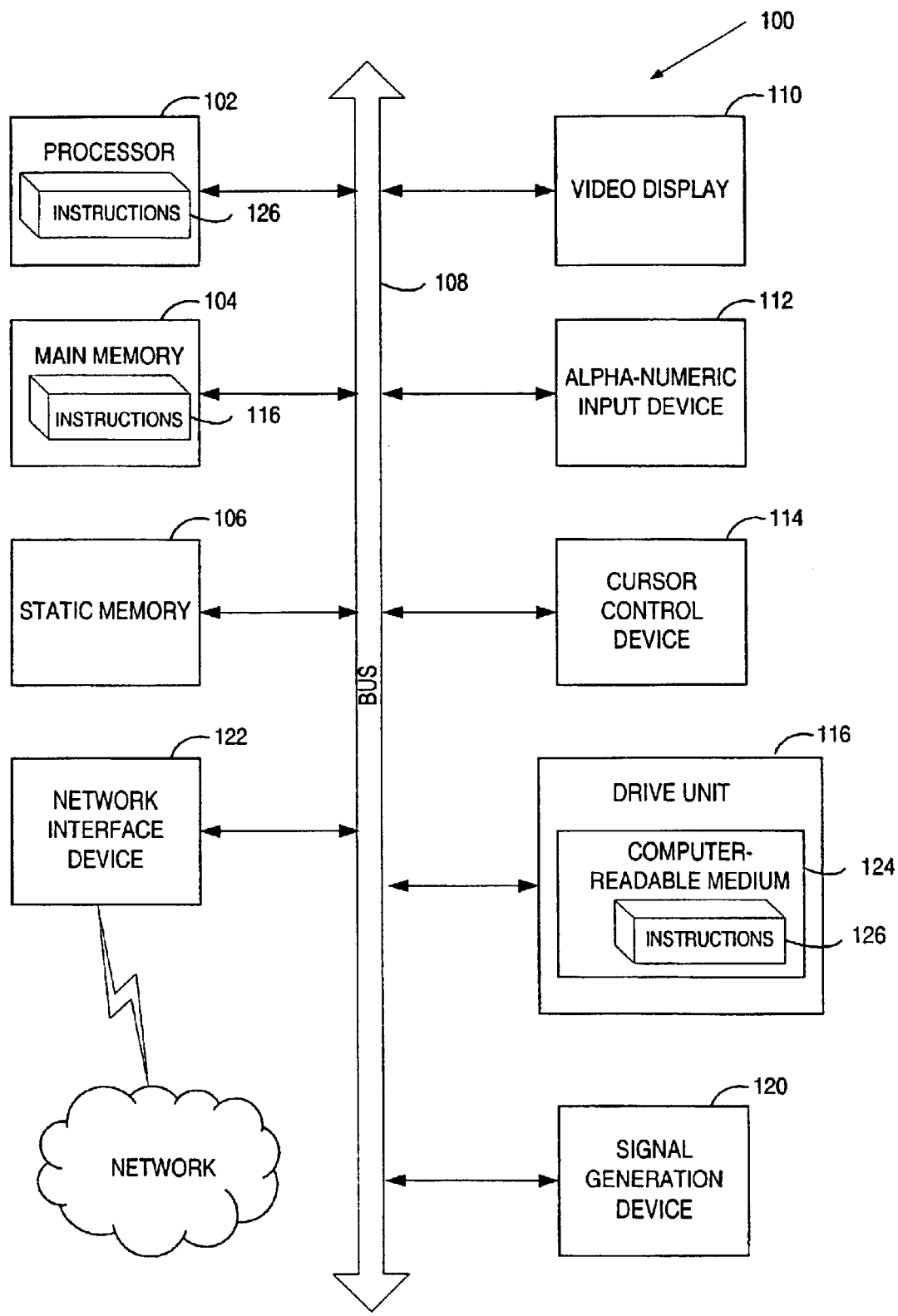
FIG. 1 shows a diagrammatic representation of machine in the exemplary form of a computer system.

Described herein is a method and apparatus for compiler assisted power management. In the following description numerous specific details are set forth. One of ordinary skill in the art, however, will appreciate that these specific details are not necessary to practice embodiments of the invention. While certain exemplary embodiments have been described and shown in the accompanying drawings, it is to be understood that such embodiments are merely illustrative and not restrictive of the current invention, and that embodiments of this invention are not restricted to the specific constructions and arrangements shown and described since modifications may occur to those ordinarily skilled in the art.

Some portions of the detailed descriptions that follow are presented in terms of algorithms and symbolic representations of operations on data bits within a computer memory. These algorithmic descriptions and representations are the means used by those ordinarily skilled in the data processing arts to most effectively convey the substance of their work to others ordinarily skilled in the art. An algorithm is here, and generally, conceived to be a self-consistent sequence of processing blocks leading to a desired result. The processing blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required methods. The required structure for a variety of these systems will appear from the description below. In addition, embodiments of the present invention are not described with reference to any particular programming language. It will be appreciated that a variety of programming languages may be used to implement the teachings of embodiments of the invention as described herein.

COMPUTER ARCHITECTURE

FIG. 1 shows a diagrammatic representation of machine in the exemplary form of a computer system 100 within which a set of instructions, for causing the machine to perform any one of the methodologies discussed further below, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 100 includes a processor 102, a main memory 104 and a static memory 106, which communicate with each other via a bus 108. The computer system 100 may further include a video display unit 110 (e.g., a liquid crystal display (LCD) or a cathode ray tube (CRT)). The computer system 1100 also may include an alphanumeric input device 112 (e.g., a keyboard), a cursor control device 114 (e.g., a mouse), a disk drive unit 116, a signal generation device 120 (e.g., a speaker) and a network interface device 122.

The disk drive unit 116 includes a computer-readable medium 124 on which is stored a set of instructions (i.e., software) 126 embodying any one, or all, of the methodologies described above. The software 126 is also shown to reside, completely or at least partially, within the main memory 104 and/or within the processor 102. The software 126 may further be transmitted or received via the network interface device 122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Figure 2:
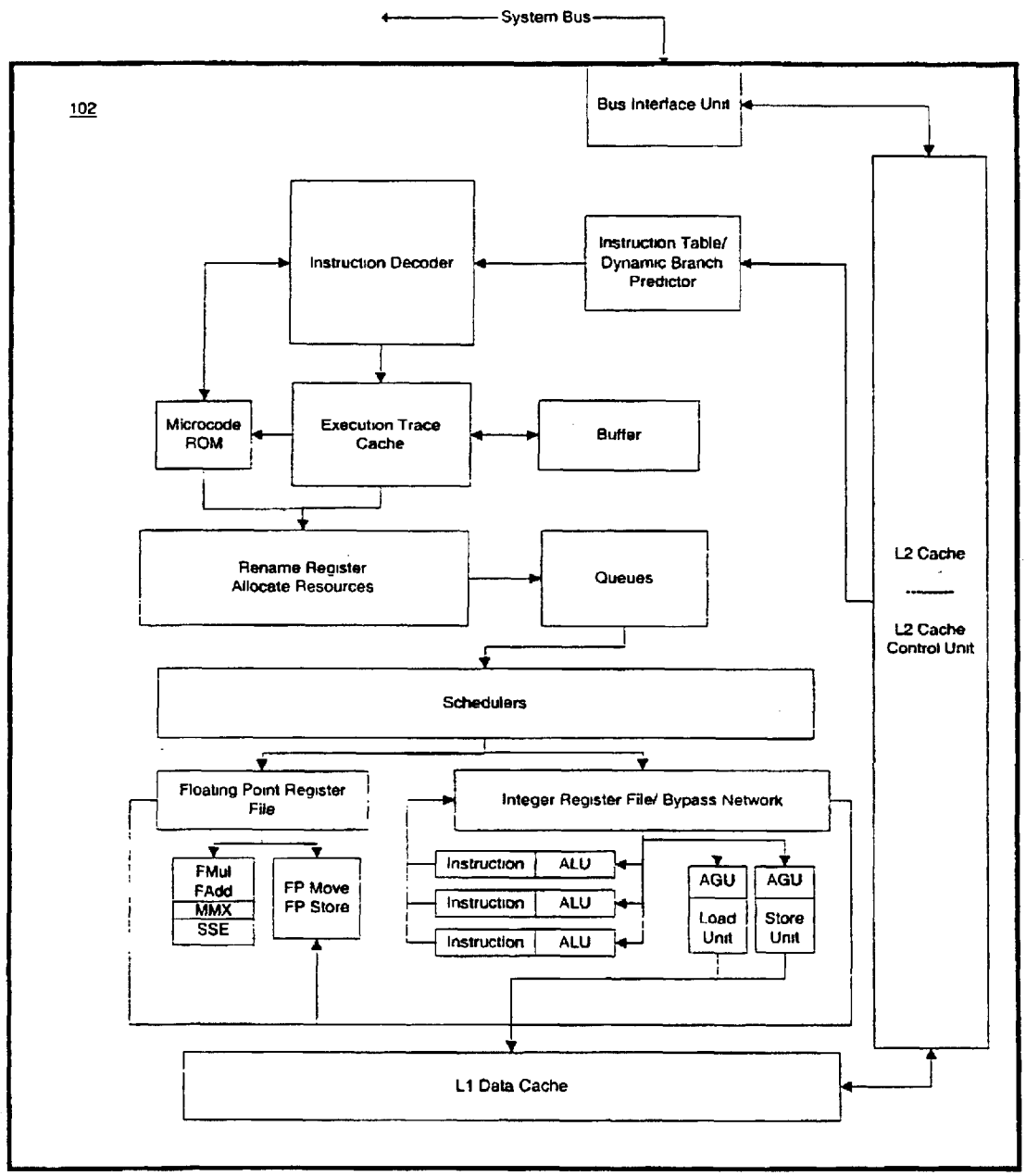
FIG. 2 illustrates an exemplary CPU with various functional units, contained thereon.

The computer processor 102, also known as a central processing unit ("CPU"), is comprised of several functional units. FIG. 2 illustrates an exemplary CPU with various functional units, contained thereon such as arithmetic logic units (ALUs), address generation units (AGUs), register files, buffers, schedulers, caches, etc. These functional units consume power when executing electronic instructions, or when idle. The functional units may receive their electronic instructions by accessing a cache, or other memory device, wherein the electronic instructions are stored.

These electronic instructions are derived from computer programs, such as software applications, operating systems, etc. The majority of computer programs are developed using a high level language, such as BASIC, C, C++, etc. A computer language translation device, or translator, such as a compiler, translates operations described in the computer programs and organizes the translated operations into a sequence of electronic instructions. For example, the electronic instructions may be in the form of a low-level computer language such as assembly language. These electronic instructions may then be packaged sequentially into an executable file that can be loaded into a computer memory and executed by functional units, according to the sequence, in an electronic device, such as the functional units in the CPU 102. Some functional units in the CPU 102 may directly read and execute much of the electronic instructions. Other functional units may require even further translation of the sequence of electronic instructions. Hence, other translator devices, such as an instruction decoder unit (IDU), internal to the CPU 102, may further translate the sequence of electronic instructions into a sequence of even lower-level instructions, such as machine language or microcode.

Developers of computer programs, however, do not have to be aware of the architecture or constitution of an electronic device, such as the CPU 102. Translator devices (compilers, IDUs, etc.) are aware of an electronic device's architecture in detail and use that knowledge to translate computer programs and organize the translated operations into a sequence of electronic instructions, as in the case of a compiler, or to translate instructions into a sequence of lower-level electronic instructions in the case of an IDU, that can be read and executed by the functional units in the electronic device. The computer translator devices (compiler, IDU, etc.) can utilize the knowledge that they posses about the electronic device's architecture to generate suggestions, power-controlling instructions ("power-controlling instructions"), to be embedded into the sequence of the electronic instructions. In several embodiments of the invention, described below, these power-controlling instructions can be used to power-up functional units so that they are ready to execute when necessary. The power-controlling instructions may also be used to reduce or turn off power consumption to functional units that are not in use, or are idling.

Figure 3:
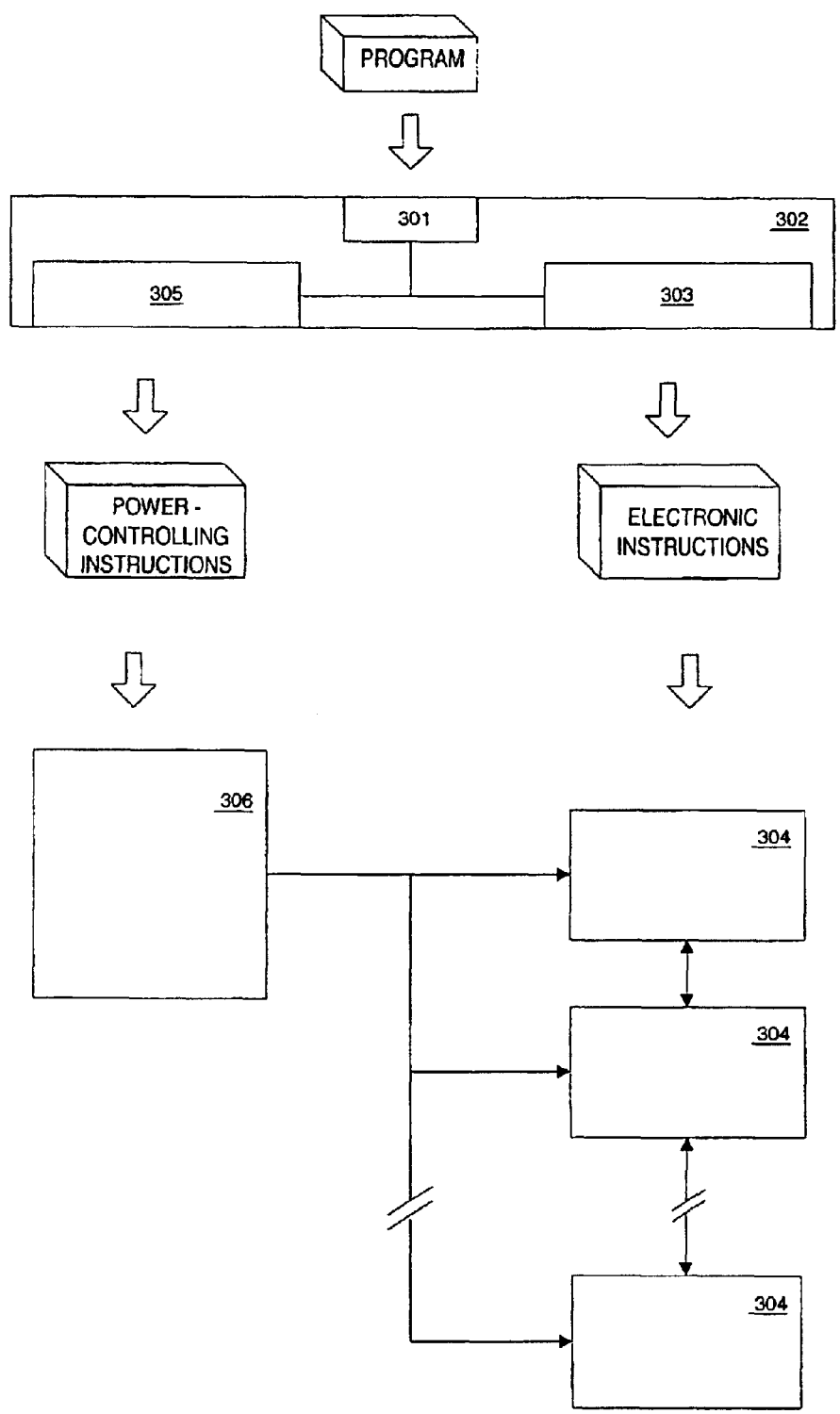
FIG. 3 is a diagram of an electronic instruction translator with power management capabilities, configured according to one embodiment of the present invention.

FIG. 3 is a diagram of an electronic instruction translator 302 with power management capabilities, configured according to one embodiment of the present invention. Referring to FIG. 3, the electronic instruction translator 302 is to translate a program into a sequence of electronic instructions for execution by at least one functional unit 304 in an electronic device, analyze timing of the sequence of electronic instructions, and generate corresponding power-controlling electronic instructions ("power-controlling instructions"). The functional units 304 may be any electronic device that receives and executes electronic instructions. Electronic instructions may be defined as any type of electronic (electrical, magnetic, etc.) signals, notations, languages, routines, algorithms, etc., having instructional information for use by an electronic device.

In one embodiment of the invention, the electronic instruction translator 302 may have an interface 301 to receive a program coded in a computer language. The electronic instruction translator 302 may include an electronic instruction generator 303, coupled to the interface, to translate the computer program into the sequence of electronic instructions. The electronic instruction translator 302 may also include a power-controlling instruction generator 305, coupled to the electronic instruction generator 303, to analyze timing of the sequence of electronic instructions and to generate corresponding power-controlling electronic instructions ("power controlling instructions") to manage power consumed by any of the functional units 304.

The electronic instruction translator 302 has an intimate knowledge of the inner workings of a electronic device and how functional units 304 will execute the sequence of electronic instructions. More specifically, the electronic instruction translator 302 has knowledge of the timing necessary to utilize the functional units 304 to execute any portion of the sequence of electronic instructions. For instance, the electronic instruction translator 302 may know functional unit latency, or in other words, know how much time (e.g., in terms of clock cycles) is necessary for a device to power-up and power-down functional units 304. In addition, since the electronic instruction translator 302 creates the sequence of electronic instructions during translation, the electronic instruction translator 302 knows the timing of the execution of instructions, or in other words, times when the functional units 304 will be in use and when the functional units 304 will not be in use, and consequently knows moments when the functional units 304 must be ready to execute any one of the electronic instructions. Therefore, in one embodiment of the invention, the electronic instruction translator 302, or more specifically, the power-controlling instruction generator 305 is to analyze the latency and timing of functional units 304 and create power-controlling instructions to control power to the functional units 304 when the functional units 304 actually execute the sequence of electronic instructions.

A power manager unit 306 may be utilized to execute the power-controlling instructions and accordingly control power to the functional units 304 as the functional units 304 execute the sequence of electronic instructions.

In one embodiment of the invention, the electronic instruction generator 303 is to translate a computer language into a sequence of low-level computer instructions to be performed by at least one functional unit in a CPU. Examples of functional units 304 that may be a on a CPU, may include a register, a test register, an instruction register, an instruction decoder, a buffer, an address latch, a program counter, an arithmetic logic unit, a memory cache, a bus interface unit, etc. Hence, in one embodiment of the invention, the electronic instruction translator 302 may also be referred to herein as a computer language translator, which can determine when the functional units 304 will be used during the execution of low-level computer instructions in a CPU. The power-controlling instruction generator 305 can then create power-controlling instructions to control power to the functional units 304 in the CPU.

One known device that may perform the function of the electronic instruction translator 302 is a compiler. A compiler is a program that translates the source code of a computer program into an object code. The source code is often written in the form of a high level language, such as C++, Java, etc, while the object code is in the form of a low-level language machine language, called assembly language. The function of a compiler is well known in the art and requires no detailed description of its translating abilities. In combination with the power-controlling instruction generator 305, the compiler may be considered to be "power-knowledgable", "power-assisting", or any such term indicating the function of the compiler beyond simply translating and organizing instructions, but also analyzing the use of functional units according to the instruction sequence and creating power-controlling instructions accordingly.

Other known devices that perform language translation functions include interpreters, assemblers, binders, linkers, loaders, etc. These devices also will convert computer programs into electronic instructions for use by a functional unit. A particular device with such translation capabilities is an instruction decoder, also known as an instruction decoder unit ("IDU"). An IDU resides inside a CPU and translates low-level electronic instructions, such as assembly language instructions, into a sequence of even lower-level electronic instructions. These lower-level electronic instructions may be in a computer language form known as microcode. Microcode instructions are the lowest-level instructions that directly control functional units 304 in some microprocessors. A single assembly language instruction may translate into several microcode instructions. Some microprocessors, however, do not utilize microcode and can be controlled directly by assembly language or machine language. The IDU may also be termed "power-knowlegable" in the same way that the compiler may be so termed.

In one embodiment, the power-controlling instruction generator 305 is to create power-controlling instructions to power-down the functional unit when the functional unit is not in use. In another embodiment, however, the power-controlling instruction generator 305 is to create power-controlling instructions to leave the functional unit power-up at times when the functional unit is not in use so that the functional unit will be ready to execute an electronic instruction when scheduled to be executed according to the sequence of electronic instructions. In another embodiment of the invention, the power-controlling instruction generator 305 is to (a) determine a delay time that would be required to power-up and power-down a functional unit 304 during run-time, or in other words, when the functional unit executes the sequence of electronic instructions, (b) predict an idle time when the functional unit will be idle during run-time, (c) compare the delay time to the idle time to determine which is longer in duration, and (d) create a power-controlling instruction depending on the comparison.

Detailed descriptions of how the electronic instruction translator 302 functions according to embodiments of a method are to be found in further detail below.

METHOD

Figure 4:
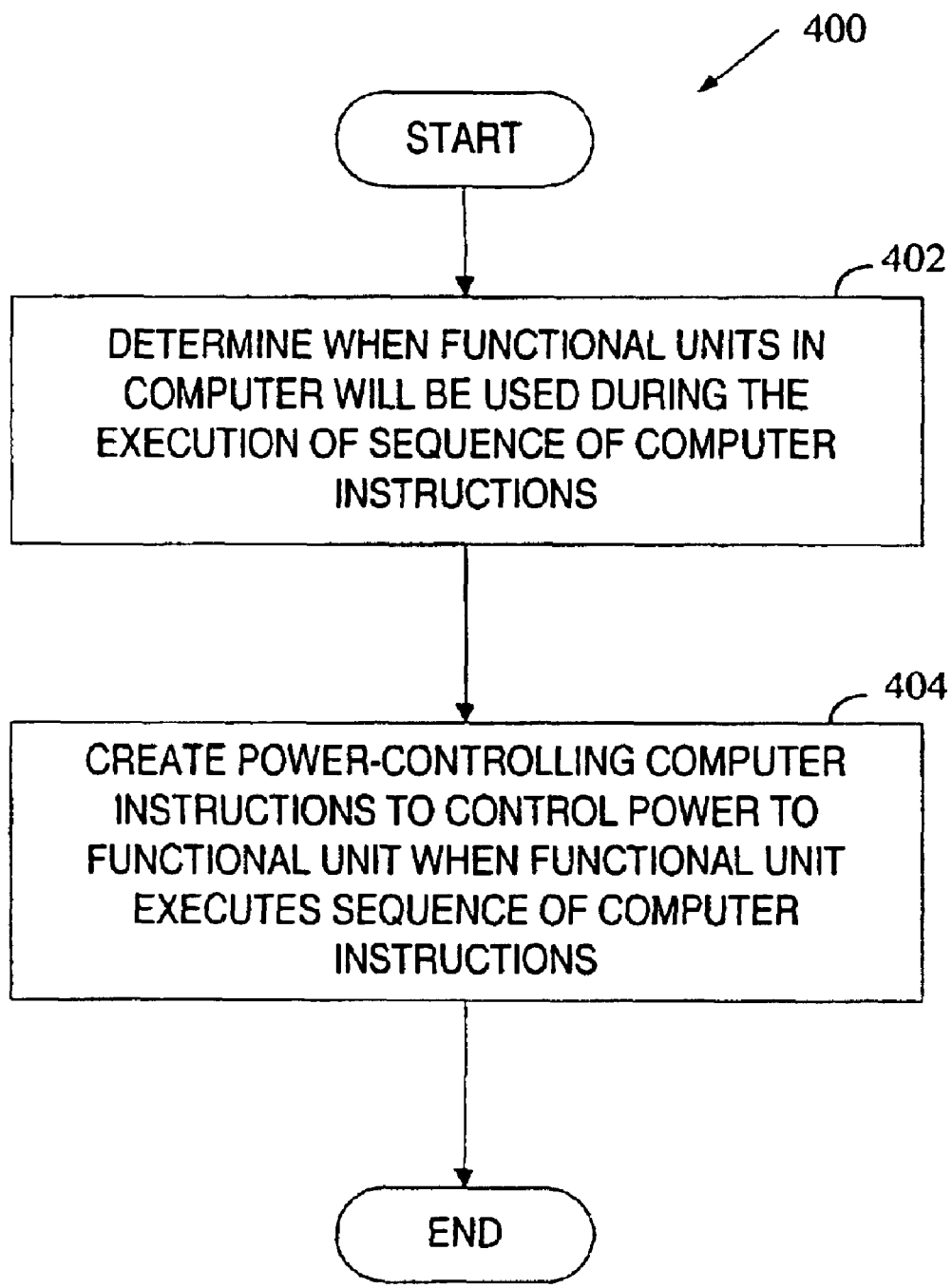
FIG. 4 is a flow diagram of a method according to one embodiment of the present invention.

FIG. 4 is a flow diagram of a method 400, according to one embodiment of the present invention. Method 400 begins, at processing block 402, with creating a sequence of electronic instructions determining when a functional unit in an electronic device will be used. As the sequence is created, a first time interval is determined for an idle-time between a first use of the functional unit and a second use of the functional unit. During the creation of the sequence, a second time interval may be determined for the time necessary to power-down the functional unit after the first use and power-it back up again to be ready for the second use. An embodiment of the invention demonstrating processing block 402 is described in further detail in conjunction with FIG. 5 below.

Still referring to FIG. 4, method 400, continues, at processing block 404, with creating power-controlling instructions to control power to the functional unit when the functional unit executes the sequence of electronic instructions. According to differences in any of the time intervals determined at processing block 402, a power-controlling instruction may be created and embedded into the sequence of electronic instructions. For example, if the first time interval is longer than the second time interval, a power-controlling instruction may be created that will power-down the functional unit between the first use and the second use, thus saving power. If however, the second time interval is longer than the first time interval, a power-controlling instruction may be created that will leave the functional unit on between the first use and the second use to optimize the performance of execution. Embodiments of the invention demonstrating processing block 404 are described in further detail in conjunction with FIGS. 6A–6C and 7A–7D below.

Figure 5:
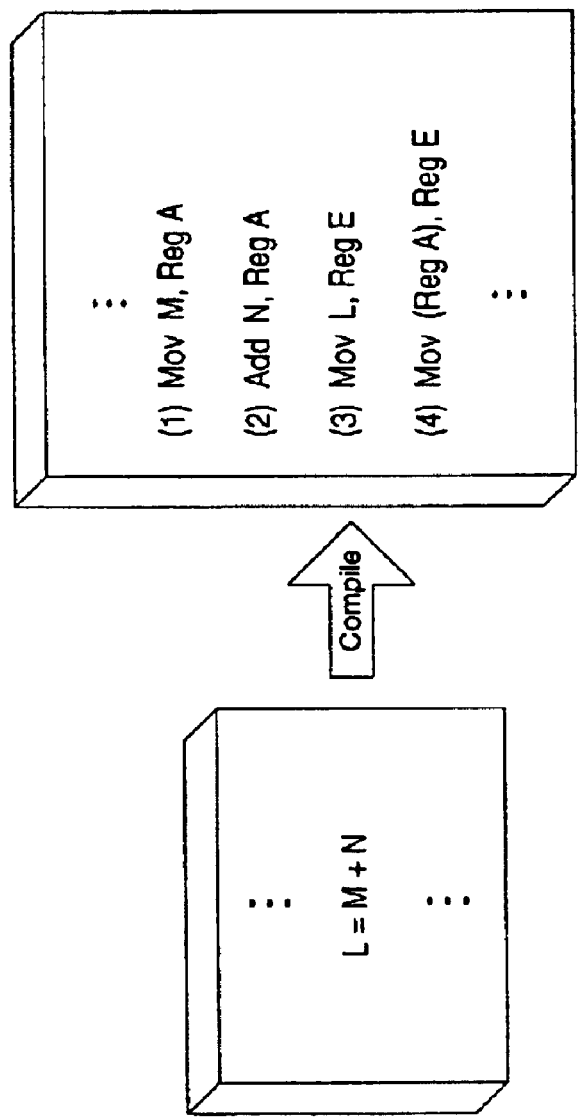
FIG. 5 is an illustration exemplifying the creation of a sequence of electronic instructions determining when a functional unit in a computer will be used, according to one embodiment of the present invention.

FIG. 5 is an illustration exemplifying the creation of a sequence of electronic instructions determining when a functional unit in an electronic device will be used, according to one embodiment of method 400 above. First, a high-level language 502 is translated, via a compiler, into a sequence of lower-level, assembly language instructions. The high-level language may be in the form of a high-level language operation, such as L=M+N, requiring that value M and value N be summed, then assigned to a value L. At compile time during the translating process, the compiler assigns functional units, such as registers Reg A and Reg E, certain assembly-language instructions that Reg A and Reg E will execute to perform the high-level language operation. Those assembly-language instructions may include:

(1) Mov M, Reg A, (moving value M to Reg A);

(2) Add N, Reg A (adding N to Reg A);

(3) Mov L, Reg E (moving the value L to Reg E); and (4) Mov (Reg A), Reg E (assigning the value in Reg A to Reg E.)

As the compiler creates the instructions, the compiler has an intimate knowledge of how long it may take a particular functional unit to complete a particular instruction. Thus, the compiler determines anticipatory time intervals, for example, a predicted number of clock cycles, necessary to complete any of the instructions, according to the sequence in which they have been organized, that will be performed by Reg A and Reg E. The anticipatory time intervals for the functional units to complete particular instructions may be termed "use-times". The compiler knows delay-time intervals, perhaps measured in clock cycles, that the functional units would require to be powered-up or powered-down during run-time. The delay-time intervals, or latency, involved in powering down and powering up the functional units must be considered to decide how early the functional unit should be powered-up so that the unit will be ready for use immediately when needed.

As used herein, terms "power-up" and "power-down", or other variations of these terms, may not necessarily mean completely turning on or turning off power to functional units. Conventional design techniques of electronic devices usually attempt to find an optimal balance between maximum performance and power savings. Several factors may be considered when deciding what actions may be taken while managing power control of functional units. As a consequence, some devices may power-up and power-down in different ways. For example, power-down actions may include shutting off a clock ("clock gating"), reducing a clock frequency, reducing voltage to the functional unit, or even shutting off the voltage to the functional unit. The amount of power consumed, and the latency involved, will depend upon which of these, or other, actions are taken. As a result, as used herein, the terms "power-up" and "power-down" may include any one of a variety of actions, only one of which may be actually completely turning on and turning off power.

Furthermore, as used herein, the definition of "power-up latency" refers specifically to the total time interval necessary to (a) communicate information to a functional unit indicating that it should begin to power-up, (b) initiate and complete the physical powering-up of the functional unit's electronic elements, and (c) ensuring that the functional unit is prepared to immediately execute an instruction. As used herein, the definition of "power-down latency" refers specifically to the total time interval necessary to (a) communicate information to a functional unit indicating that it should begin to power-down, and (b) initiate and complete the physical powering-down of the functional unit's electronic elements. When referring to power-up latency and power-down latency collectively, the term "power-cycle latency" may synonymously be used herein.

Figure 6A:
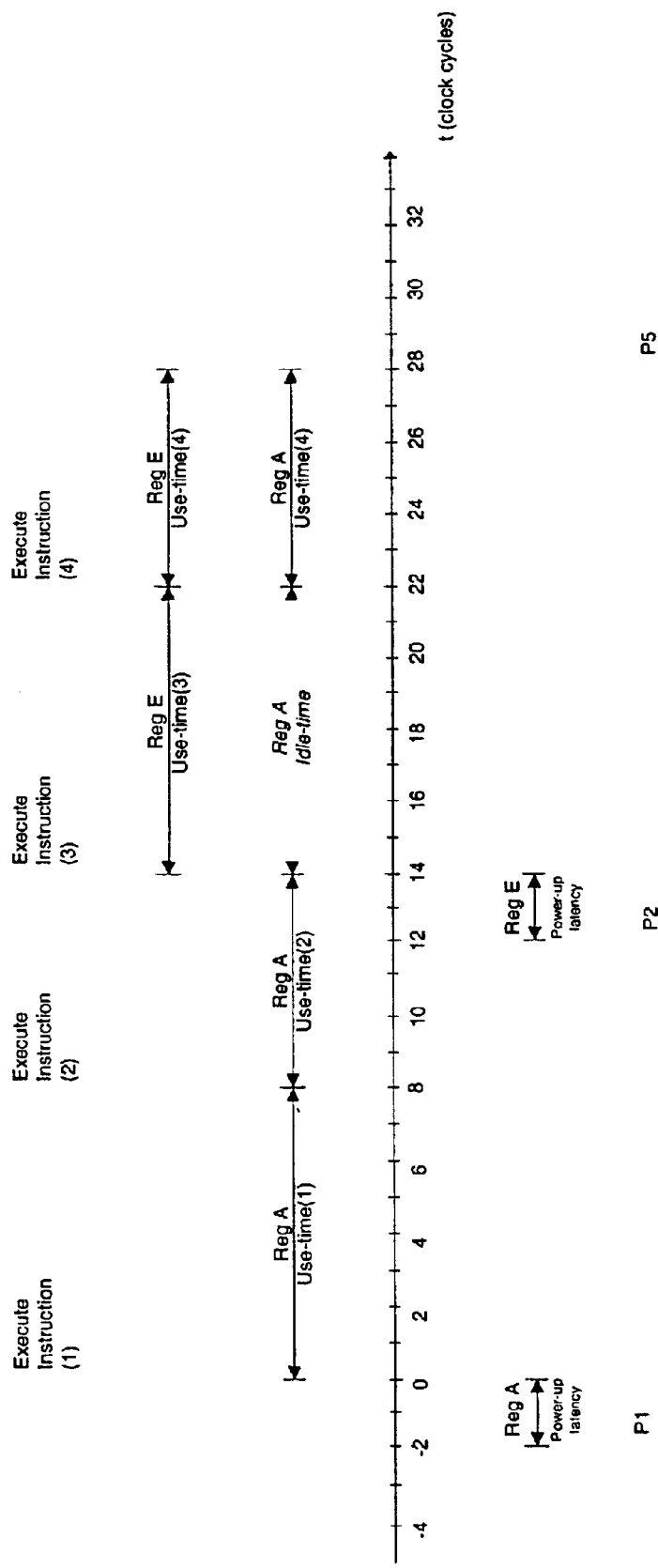
FIGS. 6A–6C are illustrations exemplifying the creation of power-controlling instructions to control power to functional units, according to one embodiment of the present invention.
Figure 6B:
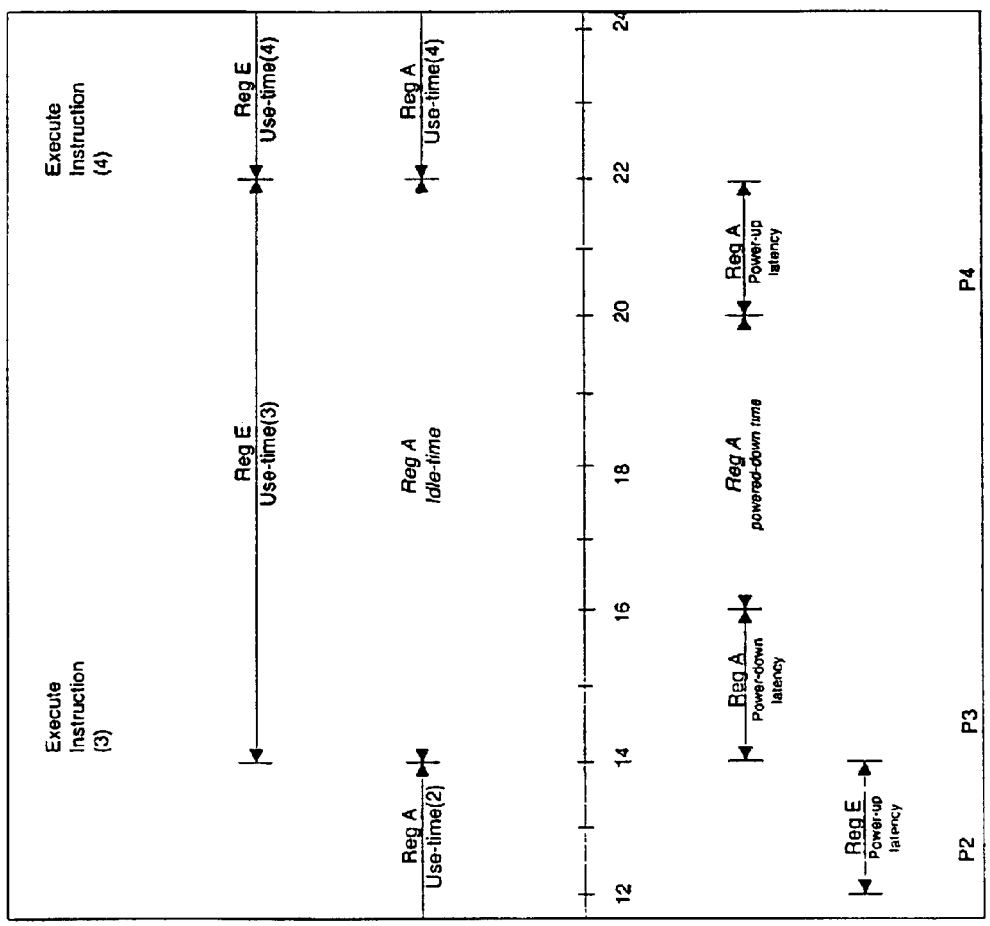
Figure 6C:
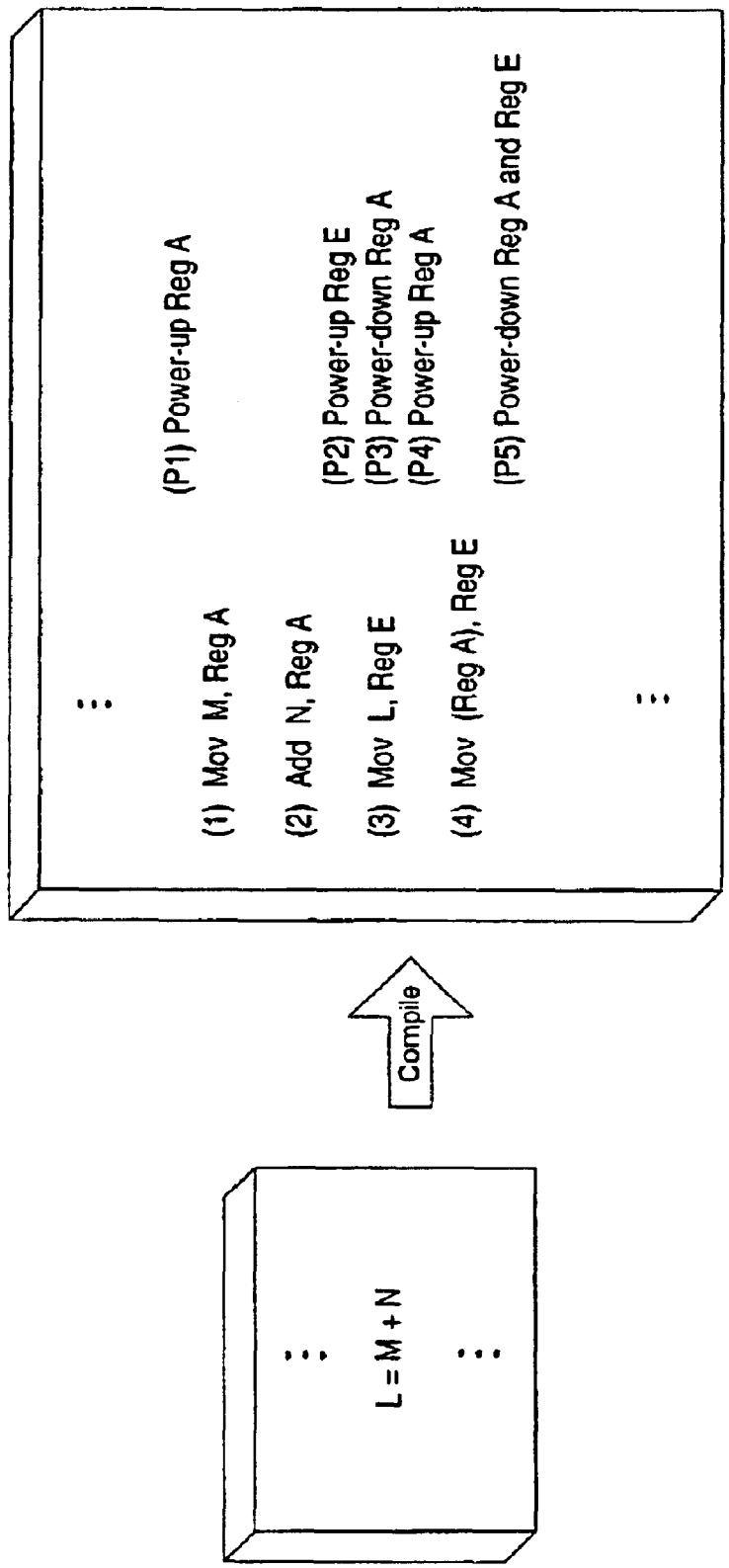

FIGS. 6A–6C are illustrations exemplifying the creation of power-controlling instructions to control power to functional units, according to one embodiment of method 400 above. Referring to FIG. 6A, a predicted time-line shows latency and use-times for Reg A and Reg E as determined by the compiler that would transpire during run-time if instructions (1) through (4) were to be executed as scheduled according to their organized sequence. Reg A and Reg E may have latencies of two clock cycles to power-up and two clock cycles to power-down. Thus, in one embodiment of the invention, the compiler can analyze the latency and use-time of Reg A and Reg E and create power-controlling instructions (P1 and P2) that will power-down Reg A and Reg E at the appropriate moments so that they will be ready to execute their respective instructions when the sequence of instructions (1)–(4) are scheduled to be executed during run-time. Additionally, the compiler may create another power-controlling instruction (P5) to power-down the registers immediately after completing the sequence of instructions. For instance, to ensure that Reg A is ready to execute instruction (1) at scheduled time t=0, the compiler may create power-controlling instruction (P1) to power-up Reg A two clock cycles before scheduled time t=0, or in other words at time t=−2. Similarly, the compiler may create power-controlling instruction (P2) to power-up Reg E at time t=12, two clock cycles before scheduled time t=14, when instruction (3) must begin. The compiler would create a power-controlling instruction (P5) to power-down Reg A and Reg E at time t=24, when the final instruction (4) is completed.

Referring still to FIG. 6A, when Reg E is scheduled to execute instruction (3), Reg A will experience an "idle time", or in other words, a time when Reg A will be waiting to execute the subsequent instruction (4). Reg A's idle time coincides with Reg E's scheduled use-time for instruction (3). Reg A's idle time may be 8 clock cycles. At run-time, during the 8 clock cycles of idle time, Reg A is on and wasting energy as it waits for Reg E to execute instruction (3). It may be advantageous for Reg A to be powered-down. Therefore, in one embodiment, shown in FIG. 6B, the compiler may compare the predicted idle time to the power-cycle latency time necessary to power-up and power-down Reg A, and if the predicted idle time is longer, create a power-controlling instruction (P3) that will power-down Reg A during its idle time. The compiler may also create a power-controlling instruction (P4) to power-up Reg A so that it is ready to execute the next instruction immediately when scheduled. The compiler knows that the power-down latency of Reg A is two clock cycles, as is the power-up latency, equaling 4 clock cycles of total power-cycle latency. The compiler need only compare the idle time (8 clock cycles) to the total power-cycle latency (4 clock cycles) to realize that, in addition to any power-savings realized during powering-down and powering up, Reg A could save power during the additional 4 clock cycles beyond the power-cycle latency, if it were powered-down. The compiler would, therefore, create the power-controlling instruction (P3) to power-down Reg A immediately after Reg A completed instruction (2), at time t=14. Since, the compiler also knows that Reg A must be ready to execute instruction (4) at time t=22, it can create another power-controlling instruction (P4) to begin Reg A's power-up at time t20. FIG. 6C illustrates an exemplary instruction sequence with power-controlling instructions (P1, P2, P3, P4, and P5) embedded into the sequence of electronic instructions (1)–(4).

Figure 7A:
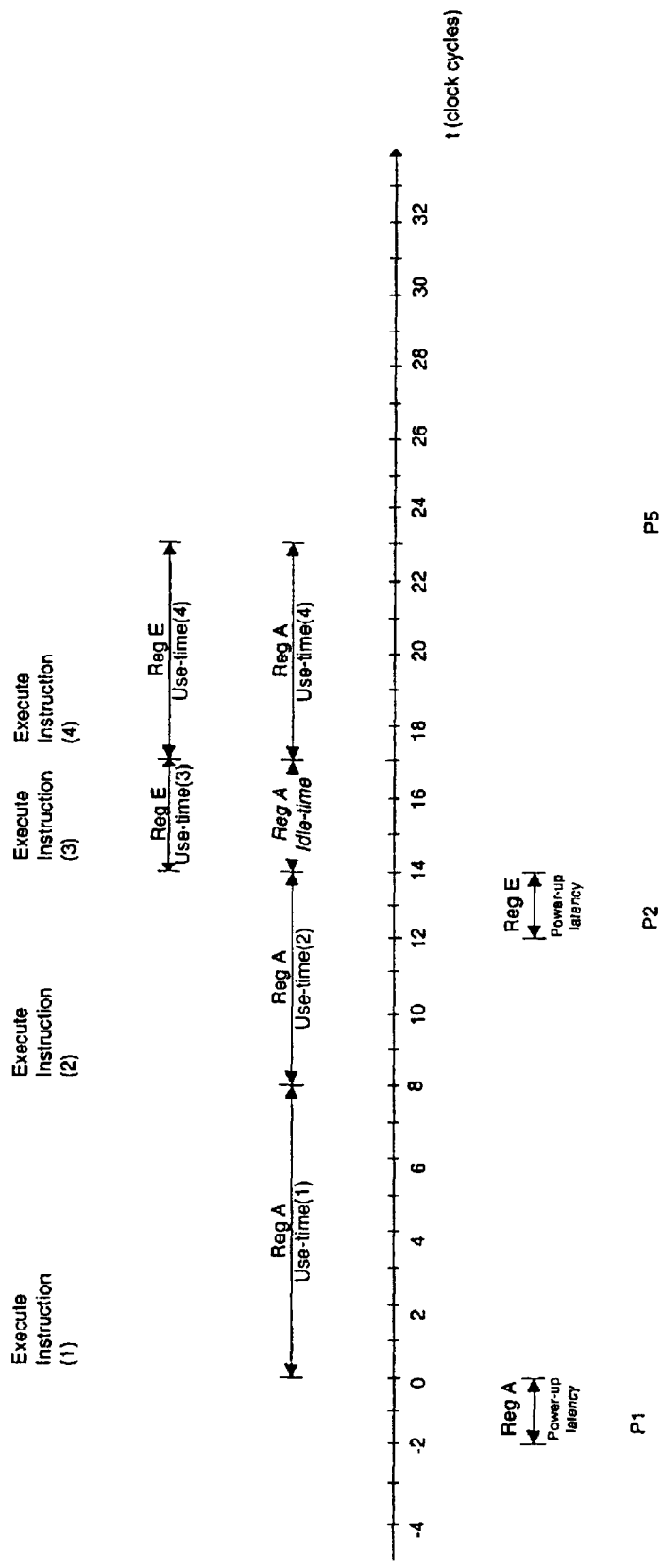
FIGS. 7A–7D are illustrations exemplifying the creation of power-controlling instructions to control power to functional units, according to other embodiments of the present invention.
Figure 7B:
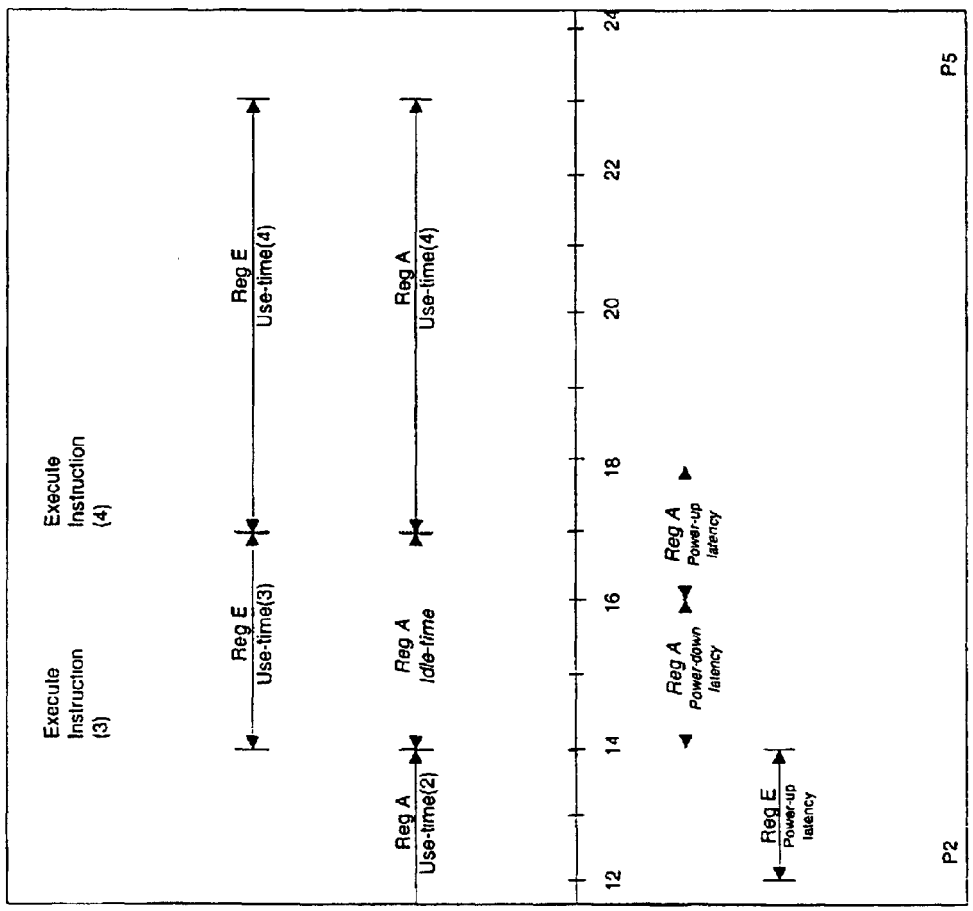

FIGS. 7A–7D are illustrations exemplifying the creation of power-controlling instructions to control power to functional units, according to other embodiments of method 400 above. In the embodiment shown in FIGS. 7A–7D, the compiler may determine that it would not be advantageous to power-down Reg A as was shown in FIGS. 6A–6C. Referring to the embodiment shown in FIG. 7A, the scheduled use-time for Reg E may be only 3 clock cycles to complete instruction (3) (as opposed to 8 clock cycles shown in FIGS. 6A–6C). Consequently, Reg A's idle time would only be 3 clock cycles. If the power-cycle latency for Reg A required 4 clock cycles, then, as shown in FIG. 7B, the compiler may determine that the power-savings possible during Reg A's idle time would only be the power saved during power-down, since the functional unit would immediately have to power-up again to complete the next instruction (4) as scheduled. In fact, the power-cycle latency required would be longer than the idle time, and if Reg A were to be powered-down immediately after executing instruction (2), then Reg A would not be able to begin executing instruction (4) until four clock cycles after completing instruction (2). On the contrary, if Reg A were left on during the idle time, then Reg A would be ready to begin executing instruction (4) three clock cycles after completing instruction (2). As a result, one clock cycle of time may be saved by not powering down Reg A during its idle time. Therefore, the compiler may recognize when power-savings will conflict with the performance (speed) of executing the instructions, and create, or refrain from creating, a power-controlling instruction to leave Reg A powered during the idle-time.

Figure 7C:
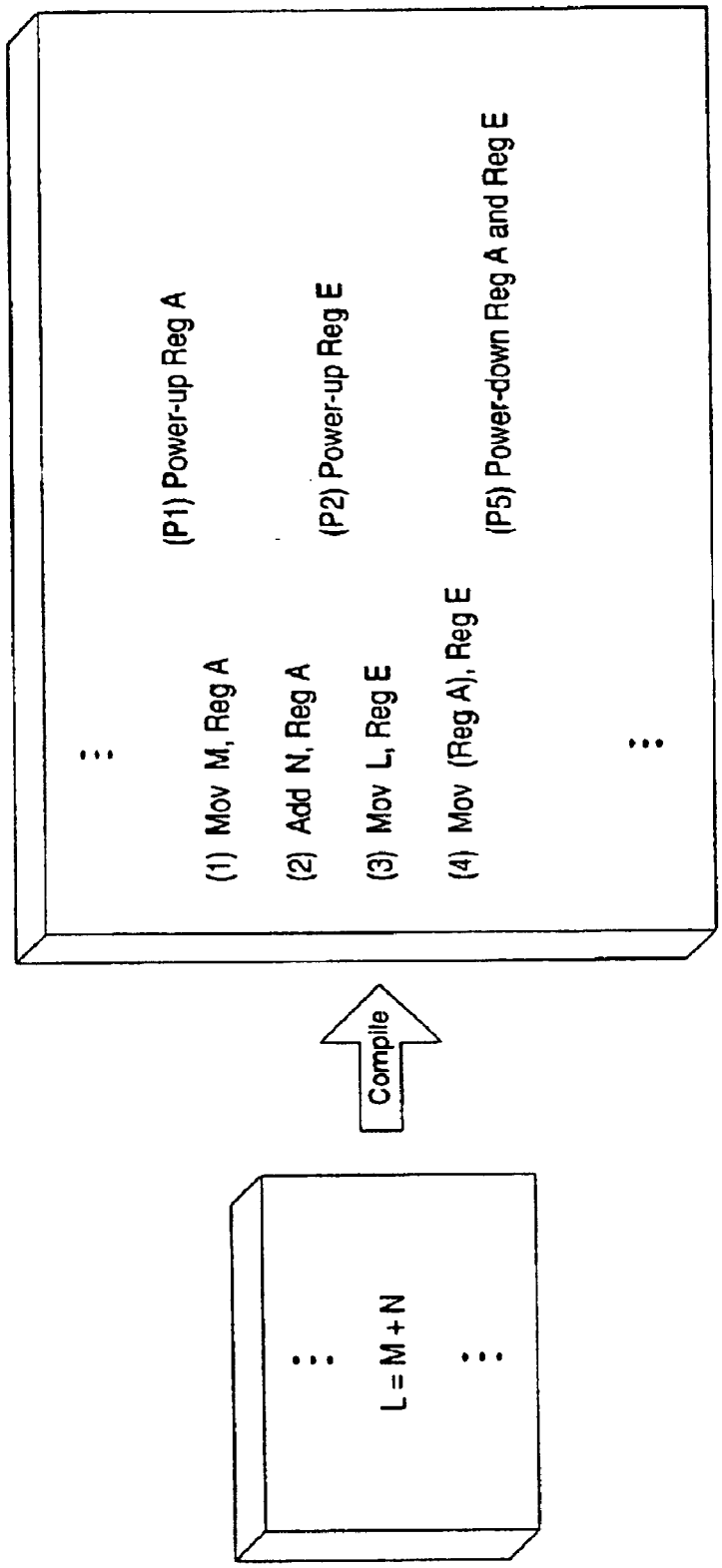
Figure 7D:
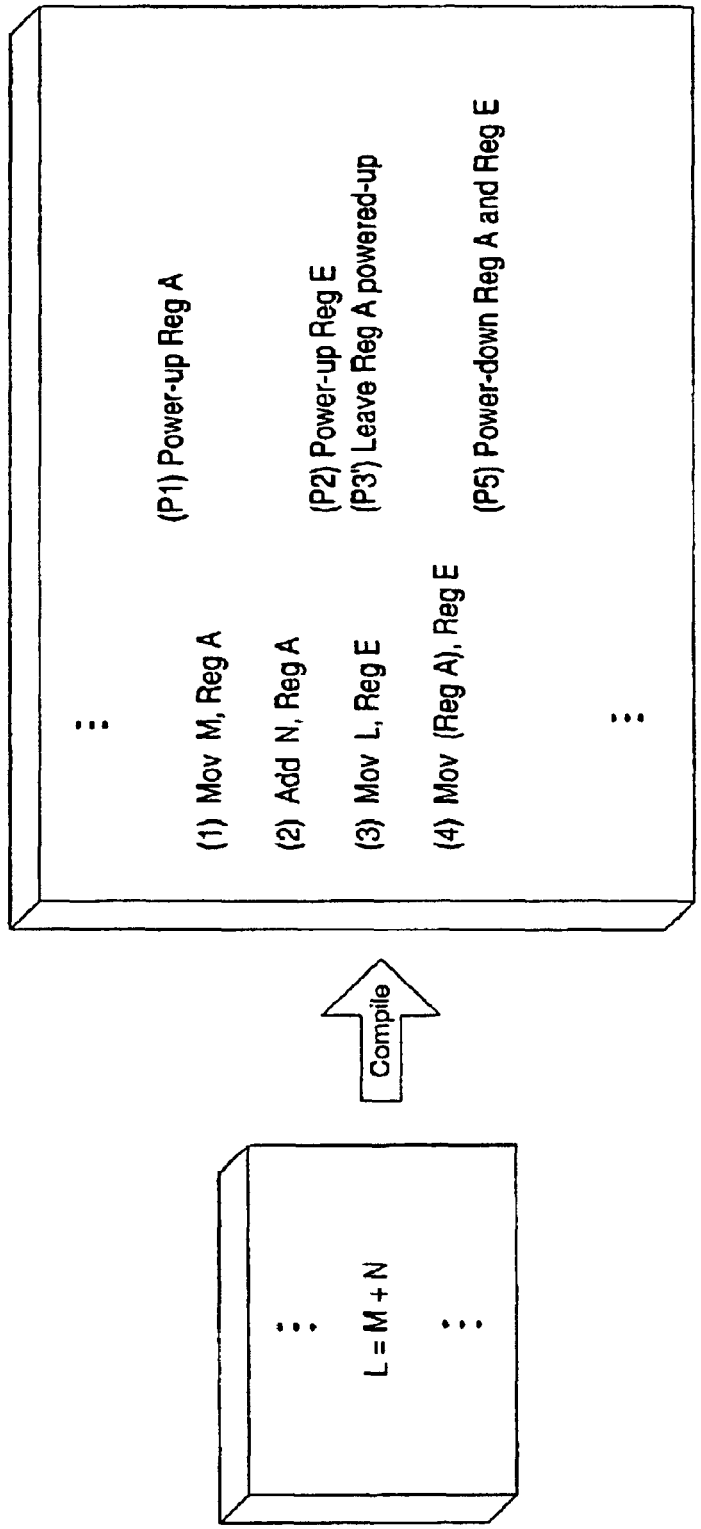

In the embodiments described above, it is assumed that Reg A has a default power-state setting that remains powered-up after being give an initial instruction to power-up, unless given a power instruction to power-down. Thus, in the embodiment shown in FIG. 7B, the compiler may refrain from creating any power-controlling instructions, thus maintaining Reg A powered-up. FIG. 7C shows the resultant instruction sequence. It is conceivably, however, that Reg A may be configured to have a different default power-state settings. For instance, Reg A may be configured to automatically power-down any functional unit after a certain amount of idle time, for example, after one idle clock cycle. In such a scenario, if the compiler were to determine that power-savings would interfere with performance, such as in the embodiment shown in FIG. 7B, then the compiler would need to create a power-controlling instruction (P3') to leave Reg A's powered-up during the idle time. The resultant instruction sequence is shown in FIG. 7D.

In one embodiment of the invention, the compiler may have power-saving settings that could be set by a user that would dictate the compiler's actions. For example, the user may choose between a "Power Save" mode and a "Performance" mode. It the compiler were set to the Power Save mode, then it may create power-controlling instructions to power-down functional units during idle times even if the power-savings affect performance. On the other hand, if the compiler were set to Performance mode, then the functional unit would only be powered-down when there would be no conflict with performance, such as in the scenario described in FIG. 6B. If there were to be a conflict, the functional unit would be left on, such as in the scenario described in FIG. 7B.

Figure 8:
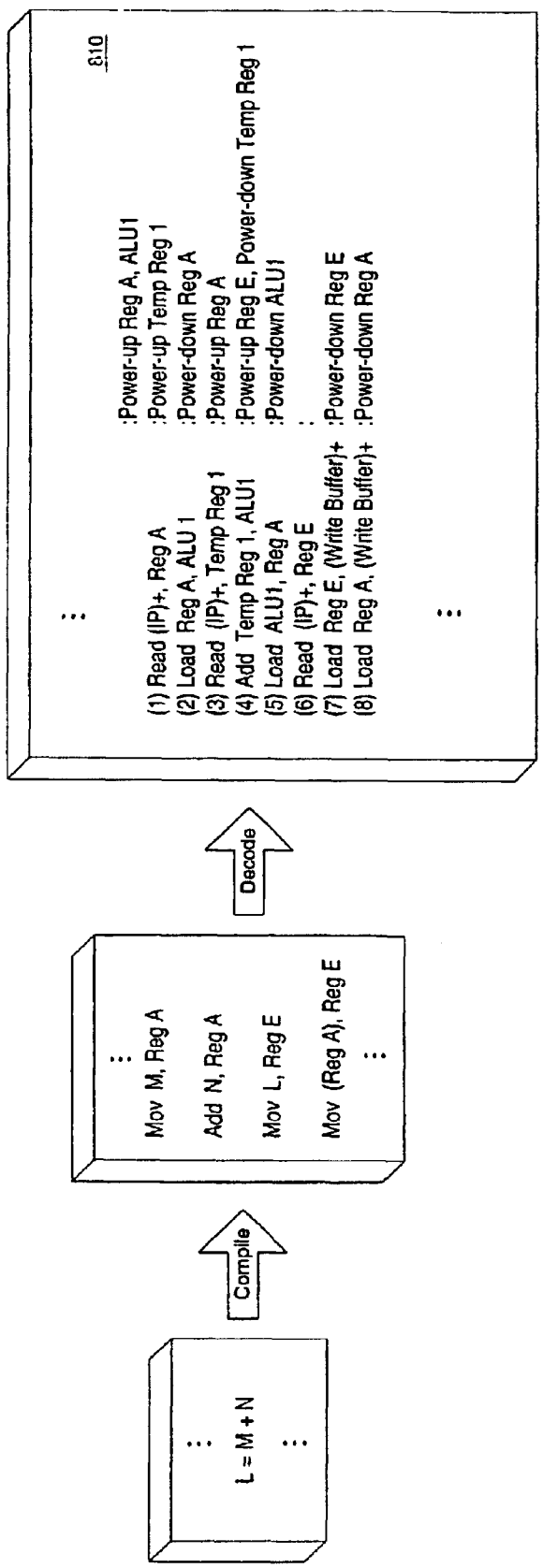
FIG. 8 illustrates a resultant instruction sequence of IDU working in conjunction with a compiler, according to one embodiment of the present invention.

In the embodiments of invention described above, method 400 was described as being performed by a compiler. However, some microprocessors utilize devices, such as an IDU, that can further translate assembly language and machine language into a form of microprocessor specific code. FIG. 8 illustrates a resultant instruction sequence of IDU working in conjunction with a compiler, according to one embodiment of the method 400. Referring to FIG. 8, a compiler translates a high-level language operation (L=M+N) into a sequence of low-level electronic instructions, such as assembly language instructions. An IDU translates the low-level electronic instructions into a sequence of even lower-level electronic instructions, such as microcode instructions. The IDU analyzes the sequence of microcode instructions (1)–(8) to be executed by various functional units such as registers (Reg A, Reg E, Temp Reg 1), arithmetic logic units (ALU1) and buffers (Write Buffer). The IDU determines use-times and latencies of a functional unit, similar to embodiments described above. The IDU can then create power-controlling instructions 810 to control power to the functional units during run-time when the functional units execute the microcode instructions. Depending on the differences in use-times and latencies, the IDU may create power-controlling instructions 810 to save power or to optimize performance, also similar to embodiments described above.

Savings in power consumption, as a result of embodiments of the present invention, can also result in lower temperatures on an electronic device, such as a microprocessor chip. Consequently, lower temperatures can lead to significant reliability and endurance of the chip's circuitry, as well as improved performance of functional units on the microprocessor.

Figure 9:
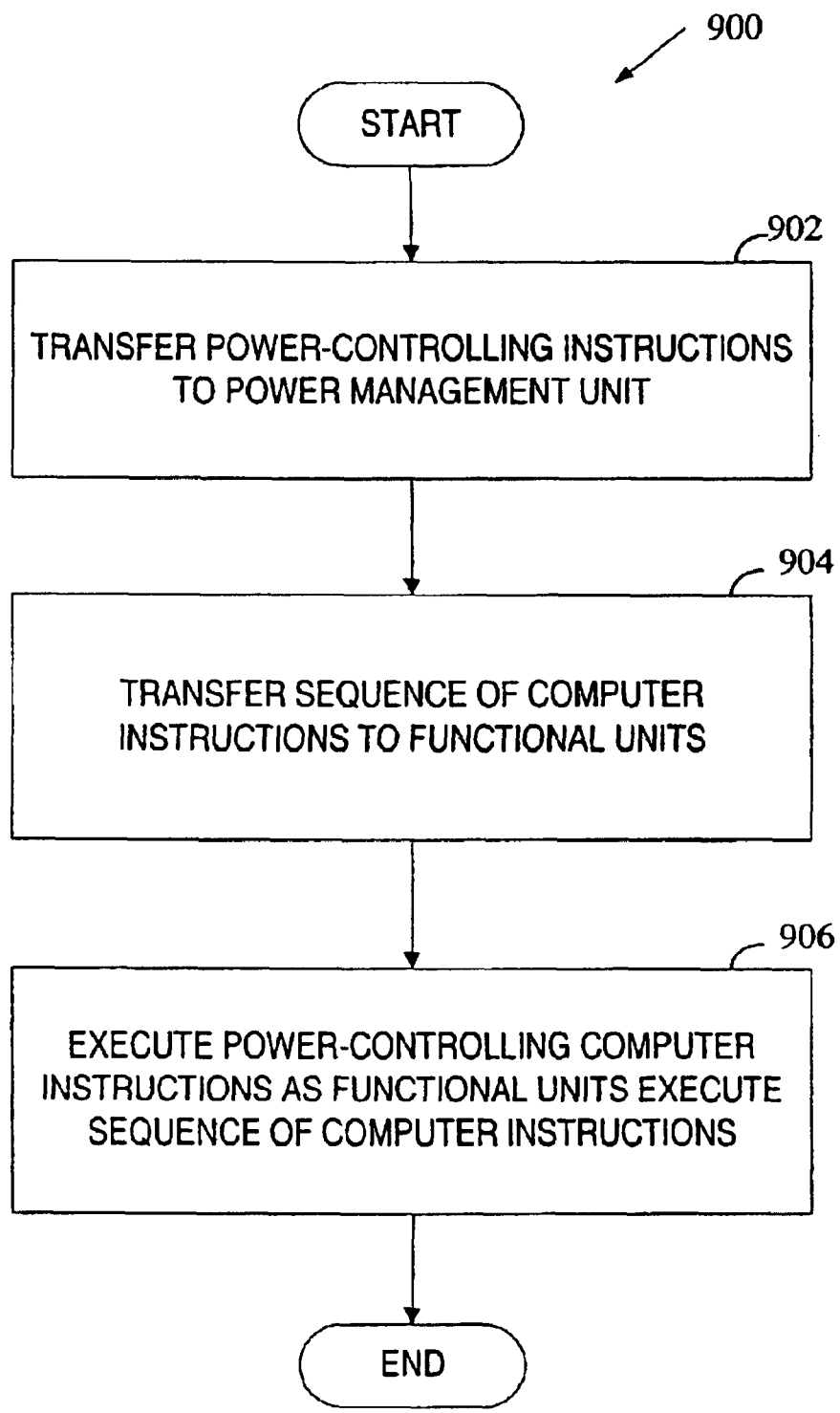
FIG. 9 is a flow diagram of a method according to one embodiment of the invention.

FIG. 9 is a flow diagram of a method 900 according to one embodiment of the invention. Referring to FIG. 9, the method 900 may include, as shown at processing block 902, transferring power-controlling instructions, created by an electronic instruction translator device, to a power management unit to execute the power-controlling instructions during run-time. In one embodiment, the power-management unit may be positioned on, or in close proximity to, a CPU. At run-time, method 900 may also include, as shown at processing block 904, transferring any portion of a sequence of electronic instructions to functional units in the electronic device to execute the sequence of electronic instructions. As the functional units execute the electronic instructions, method 900 may further include, as shown at processing block 906, executing the power-controlling instructions, as described in any of the embodiments above, for instance, to power-down the functional unit at times when the functional unit is not in use during the execution of the sequence of electronic instructions, to conserve power.

Several embodiments of the invention have thus been described. However, those ordinarily skilled in the art will recognize that the invention is not limited to the embodiments described, but can modified and altered within the spirit and scope of the appended claims that follow.

What is claimed is:

1. An electronic instruction translator with power management, comprising:
   a interface to receive a program coded in a computer language;
   an electronic instruction generator, coupled to the interface, to translate the program into a sequence of electronic instructions for execution by at least one functional unit in an electronic device; and
   a power-controlling instruction generator, coupled to the electronic instruction generator, to analyze timing of the sequence of electronic instructions to determine a first time interval between a first use of the functional unit and a second use of the functional unit and to generate corresponding power-controlling instructions to manage power consumed by the at least one functional unit, based on the determination of a second time interval necessary to power-down the functional unit after the first use and power-up of the functional unit to be ready for the second use.

2. The electronic instruction translator of claim 1, further comprising:
   a power manager unit to execute the power-controlling instructions and accordingly control power to the functional unit when the at least one functional unit executes the sequence of electronic instructions.

3. The electronic instruction translator of claim 1, wherein the power-controlling instruction generator is to
   (a) determine a delay time that would be required to power-up and power-down the least one functional unit during run-time,
   (b) predict an idle time when the functional unit will be idle during run-time,
   (c) compare the delay time to the idle time to determine which is longer in duration, and
   (d) create a power-controlling instruction depending on the comparison.

4. The electronic instruction translator of claim 1, wherein the power-controlling instruction generator is to create power-controlling instructions to power-down the at least one functional unit when the at least one functional unit is not in use.

5. The electronic instruction translator of claim 1, wherein the power-controlling instruction generator is to create power-controlling instructions to leave the at least one functional unit powered-up at times when the at least one functional unit is not in use so that the at least one functional unit will be ready to execute an electronic instruction when scheduled to be executed according to the sequence of electronic instructions.

6. The electronic instruction translator of claim 1 wherein the electronic instruction generator is any one of a compiler or an instruction decoder unit.

7. The electronic instruction translator of claim 1, wherein the electronic instructions are low-level computer instructions.

8. The electronic instruction translator of claim 1, wherein the electronic instructions are any one of assembly language, machine language, or microcode.

9. The electronic instruction translator of claim 1, wherein the at least one functional unit is a device on a computer processor.

10. A method comprising:
    creating a sequence of electronic instructions determining when a functional unit in an electronic device will be used;
    creating power-controlling instructions to control power to the functional unit when the functional unit executes the sequence of electronic instructions;
    analyzing the sequence of electronic instructions to determine a first time interval between a first use of the functional unit and a second use of the functional unit; and
    determining a second time interval necessary to power-down the functional unit after the first use and power-up the functional unit to be ready for the second use.

11. The method of claim 10, further comprising creating a power-controlling instruction to power-down the functional unit between the first use and the second use if the first time interval is longer than the second time interval.

12. The method of claim 10, further comprising creating a power-controlling instruction to leave the functional unit powered-up between the first use and the second use if the second time interval is longer than the first time interval.

13. The method of claim 10, further comprising:
    transferring the power-controlling instructions to a power management unit in the computer to execute the power-controlling instructions;
    transferring any portion of the sequence of electronic instructions to the functional unit in an electronic device to execute the portion of sequence of electronic instructions; and
    executing the power-controlling instructions to power-down the functional unit at times when the functional unit is not in use during the execution of the sequence of electronic instructions.

14. The method of claim 10, wherein the method is performed by any one of a compiler or an instruction decoder unit.

15. The method of claim 10, wherein the sequence of electronic instructions are any one of assembly language or microcode.

16. A method, comprising:
    analyzing a sequence of electronic instructions to be completed by a functional unit in a computer and determining a first moment in the sequence when the functional unit will complete a first electronic instruction;
    determining a first time interval that will elapse from the first moment to a second moment when the functional unit will begin to perform a second electronic instruction;
    determining a second time interval that will elapse to completely power-down the functional unit and completely power up the functional unit;
    comparing the first and second time intervals to determine which is longer in duration; and
    creating a power-controlling instruction to control power to the functional unit depending on which time interval is longer in duration.

17. The method of claim 16, wherein if the first time interval is longer than the second time interval, then the power-controlling instruction is to power-down the functional unit immediately after the functional unit completes the first electronic instruction.

18. The method of claim 16, further comprising:
creating a power-controlling instruction to power-up the functional unit before the second moment so that the functional unit is ready to begin executing the second instruction at the second moment.

19. The method of claim 16, wherein if the first time interval is shorter than the second time interval, then creating a power-controlling instruction to leave the functional unit powered-up.

20. A system, comprising:
an electronic device including at least one functional unit, the at least one functional unit to execute electronic instructions;
a power-knowledgeable electronic instruction translator to
(1) translate a computer program into a sequence of electronic instructions for execution by the at least one functional unit,
(2) analyze timing of the sequence of electronic instructions to determine a first time interval between a first use of the functional unit and a second use of the functional unit,
(3) generate corresponding power-controlling instructions to manage power consumed by the at least one functional unit through the determination of a second time interval necessary to power-down the functional unit after the first use and power-up of the functional unit to be ready for the second use; and
a power manager unit to execute the power-controlling instructions and accordingly control power to the at least one functional unit when the at least one functional unit executes the sequence of electronic instructions.

21. The system of claim 20, wherein the electronic device is a microprocessor.

22. The system of claim 20, wherein the electronic instruction translator comprises:
an interface to receive the computer program;
an electronic instruction generator, coupled to the interface, to translate the program into the sequence of electronic instructions; and
a power-controlling instruction generator, coupled to the electronic instruction generator, to analyze the timing of the sequence of electronic instructions and to generate the corresponding power-controlling instructions.

23. The system of claim 20, wherein the electronic instruction translator is a power-knowledgeable compiler.

24. A computer readable storage medium containing executable computer program instructions which when executed cause an electronic instruction translator to perform a method comprising:
creating a sequence of electronic instructions determining when a functional unit in an electronic device will be used;
creating power-controlling instructions to control power to the functional unit when the functional unit executes the sequence of electronic instructions;
analyzing the sequence of electronic instructions to determine a first time interval between a first use of the functional unit and a second use of the functional unit; and
determining a second time interval necessary to power-down the functional unit after the first use and power-up the functional unit to be ready for the second use.

25. The computer readable storage medium of claim 24, wherein the method further comprises creating a power-controlling instruction to power-down the functional unit between the first use and the second use if the first time interval is longer than the second time interval.

26. The computer readable storage medium of claim 24, wherein the method further comprises creating a power-controlling instruction to leave the functional unit powered-up between the first use and the second use if the second time interval is longer than the first time interval.

27. The computer readable storage medium of claim 24, wherein the method further comprises:
transferring the power-controlling instructions to a power management unit in the computer to execute the power-controlling instructions;
transferring any portion of the sequence of electronic instructions to the functional unit in an electronic device to execute the portion of sequence of electronic instructions; and
executing the power-controlling instructions to power-down the functional unit at times when the functional unit is not in use during the execution of the sequence of electronic instructions.

28. The computer readable storage medium of claim 24, wherein the sequence of electronic instructions are any one of assembly language or microcode.

29. An electronic instruction translator with power management, comprising:
a interface to receive a program coded in a computer language;
an electronic instruction generator, coupled to the interface, to translate the program into a sequence of electronic instructions for execution by at least one functional unit in an electronic device; and
a power-controlling instruction generator, coupled to the electronic instruction generator, to analyze timing of the sequence of electronic instructions and to generate corresponding power-controlling instructions to manage power consumed by the at least one functional unit,
wherein the power-controlling instruction generator is to
(a) determine a delay time that would be required to power-up and power-down the least one functional unit during run-time,
(b) predict an idle time when the functional unit will be idle during run-time,
(c) compare the delay time to the idle time to determine which is longer in duration, and
(d) create a power-controlling instruction depending on the comparison.

* * * * *